United States Patent [19]

Crossland et al.

[11] 4,130,408
[45] Dec. 19, 1978

[54] METHOD OF FORMING LARGE LIQUID CRYSTAL CELLS

[75] Inventors: William A. Crossland, Harlow; Joseph H. Morrissy, Dunmow, both of England

[73] Assignee: International Standard Electric Corporation, New York, N.Y.

[21] Appl. No.: 821,027

[22] Filed: Aug. 1, 1977

[30] Foreign Application Priority Data

Sep. 3, 1976 [GB] United Kingdom ............... 36692/76

[51] Int. Cl.² ............................................. C03B 23/20
[52] U.S. Cl. .......................................... 65/43; 65/58
[58] Field of Search ........................... 65/43, 58, 42

[56] References Cited

U.S. PATENT DOCUMENTS 3,860,405   1/1975   Coucoulas ........................... 65/58 X
3,947,260   3/1976   Salisbury ............................. 65/58 X Primary Examiner—Arthur D. Kellogg
Attorney, Agent, or Firm—John T. O'Halloran; Peter C. Van Der Sluys

[57] ABSTRACT

A method of controlling the spacing between the panels in large area liquid crystal cells consisting of the application of an array of spacer dots on one panel and an array of tie dots on the other panel. Upon firing the panels, the spacer dots remain rigid to define the spacing whereas the tie dots soften and deform.

18 Claims, 2 Drawing Figures

METHOD OF FORMING LARGE LIQUID CRYSTAL CELLS

FIELD OF THE INVENTION

This invention relates to glass envelope manufacture.

BACKGROUND OF THE INVENTION

The manufacture of certain types of display cells calls for the construction of glass envelopes formed by sealing together two glass sheets with a perimeter seal. For some applications, such as in the construction of liquid crystal display cells, the thickness of the interior space of the envelope is a relatively critical parameter. Up to a certain size of liquid crystal display cell adequate control of this thickness is given solely by control of the thickness of the perimeter seal. It will be apparent, however, that if the cell size is to be increased, the flatness of the two sheets will have to be held to correspondingly closer tolerances. At a certain stage these tolerances can only be met by optically working the surfaces of the two sheets. This necessarily involves using relatively thick sheets, and this is undesirable for a number of applications. For instance, in a liquid crystal display cell operated in a reflective mode it is liable to involve separating the reflecting surface from the liquid crystal material by such a distance as to restrict substantially the viewing angle because of the parallax effects between the liquid crystal layer and its image in the reflecting surface. Some of these disadvantages are removed, or at least ameliorated, if at least one of the sheets is relatively thin.

SUMMARY OF THE INVENTION

According to the present invention, there is provided a method of making an envelope in which two glass sheets are secured with a glass perimeter seal to form the envelope, wherein one of the sheets is provided with an array of heat treated glass spacer dots having a softening point above that of the sheets, which heat treated dots are made of material applied to the sheet and fused to produce the heat treated material at a temperature beneath the softening point of the sheets, wherein one of the sheets is provided with an array of glass tie dots which are of greater thickness than that of the spacer dots and are made of a glass that flows at the softening point of the sheets, wherein one of the sheets is provided with a glass perimeter ribbon of greater thickness than that of the spacer dots and is made of a glass that flows at the softening point of the sheets, wherein the sheets are assembled with the array of dots and the perimeter ribbon facing inwardly, and wherein the assembly is fired to make the perimeter seal at a temperature at which at least one of the sheets softens sufficiently for its inner surface to distort to conform to the contour of the inner surface of the other sheet from which it is held uniformly spaced by the unsoftened spacer dots.

GENERAL DESCRIPTION OF THE INVENTION

There are two basic methods of obtaining the desired characteristic of the spacer dots, namely that they be formed at a particular temperature beneath the softening point of the two sheets in such a way as to produce a material having a softening point above that at which the spacer dots were formed. One method relies upon devitrification. The other method involves the use of a mixture of glasses chosen such that at least one constituent part of the mixture will flow at a relatively low temperature and dissolve another constituent part to form a composition having a higher flow temperature. The first method is thus normally characterized by producing an increase in the number of phases in the material, while the second method normally produces a decrease. The second method is described and explained in greater in out British patent specification No. 1,376,393 (C. F. Drake-R. W. J. Amos-J. S. P. Robinson-D. Tyldsley 42-6-3-1) to which attention is directed.

It is normally convenient to provide the arrays of dots by screen printing a glass frit paste on the float glass substrate. With this process, it is convenient to use the same glass for both the tie dots and the perimeter seal so that they can be printed simultaneously. A particularly close match of thermal expansion coefficient is not necessary between the substrate and the dots on account of the small size of the latter, but, on the other hand, a good match is desirable between the perimeter seal and both the substrate and the sheet so as to avoid introducing the extraneous optical effects of strain.

An alternative method of providing the dots is to dispense the paste from a hollow stylus or set of styli using a coordinate table to move the substrate between each marking.

In a preferred arrangement the sheets are of different thicknesses, and both arrays of dots and the perimeter track are all deposited on the thicker sheet. This thicker sheet is typically a piece of 3mm thick or thicker glass made by the float process. The thin sheet is typically not more than 1mm thick so that it can relatively readily be distorted to make its surface contour match that of the thicker sheet. This distortion may be brought about by the action of heat alone, in which case the heat is sufficient for the thin sheet to soften enough to distort under its own weight; in general, however, it is preferred to apply both heat and additional pressure to the thin sheet to distort it.

One of the key factors to be taken into account when choosing suitable glasses is the firing temperature. In general, raising the firing temperature is liable to increase the risk of the conducting tracks becoming degraded particularly in the region under the perimeter seal. On the other hand, if the firing temperature is lowered the thin sheet will not be so soft at the firing temperature, and therefore more pressure has to be applied to the assembly to get the surface contour of the thin sheet to conform to that of the thick sheet, less of the resulting stress is likely to be relieved, and hence, there is an increased risk of the completed assembly having undesirable strain patterns across the display surface.

If the perimeter seal material and the dots are both deposited as paste made from glass frit, it is generally convenient to drive off the binder and sinter the frit of both together. If the particular choice of glasses permit, it may be advantageous to combine this with the firing treatment required for heat treating the spacer dots.

DESCRIPTION OF THE PREFERRED EMBODIMENT

Figure 1:
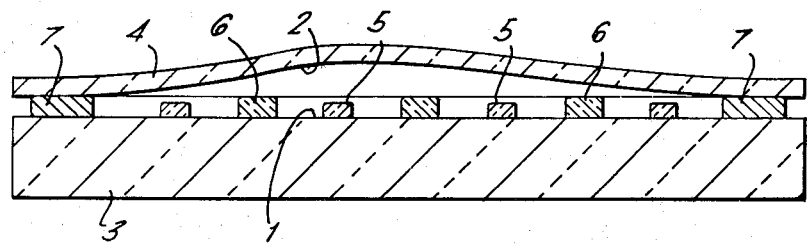
FIG. 1 is a transverse sectional view of the component parts of the cell assembled and ready for firing to make the perimeter seal according to the invention.
Figure 2:
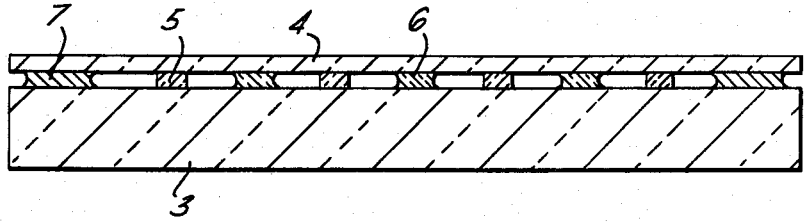
FIG. 2 is a sectional view of the assembly of FIG. 1 after firing.

The particular cell whose construction is now to be described is required to have its front and back sheets spaced apart by 12 ± 3 microns, and typically its display area measures more than 10 cm square. For panels of smaller area, it has been found that cells can be constructed to satisfy this tolerance requirement using typically 1 to 1.5mm thick glass, which rely soley upon the perimeter seal to provide the required spacing.

The surfaces 1 and 2, respectively, of a sheet 3 of 3mm thick float glass and a sheet 4 of thinner glass, typically 0.5 to 1.0mm thick, both made of soda lime glass, are provided with transparent indium-tin oxide electrodes (not shown). These electrodes are applied in conventional manner, and their configuration is to suit the particular display requirements of the completed cell. The surface 1 of the float glass is then provided with an array of dots of a paste which is either dispensed from a hollow stylus (not shown), or is applied by screen printing. The paste is formed of a glass frit made into a paste with a suitable vehicle, typically using terpineol as a solvent and ethyl cellulose as the binder. The glass frit is made of a glass that readily devitrifies at a temperature beneath the softening point of the two glass sheets to produce a material that has a higher temperature softening point than the two sheets. Examples of such glasses include Owens Illinois glasses designated CV 870 and CV 97, and an Electro Science Laboratories glass designated ESL 4010. The paste dots are fired to drive off the printing vehicle and the resulting glass dots 5 are fused and sintered to cause them to devitrify. Then, after the sheet has been cooled, a second array of paste dots is applied to the surface together with a ribbon of paste extending round the perimeter of the surface. This paste is like the first mentioned paste, but is based upon a different composition of glass frit. The thickness of the paste dots and paste ribbon is slightly greater than that of the paste dots deposited to form the array 5 so that, when they too have been fired to drive off the printing vehicle and fuse the frit, they produce an array of glass dots 6 and a glass perimeter ribbon 7 that stand slightly above the array of glass dots 5. The composition of frit used for making the second array of dots and the perimeter ribbon 7 is one which flows at a temperature beneath the softening point of the sheets 3 and 4 and which does not readily devitrify. Examples of suitable glasses include glasses made by Corning under their designations Corning 7555 and Corning 1417, and an Electro Science Laboratories glass designated ESL 4017 CMG.

The sheet 3, complete with its array of dots 5 and 6 and its perimeter ribbon 7, is placed face up underneath the thin sheet 4 which has its surface 2 face down. At this stage, the dots 5 are stood off a short distance from the surface 1 by the slightly greater thickness of the dots 6 and the ribbon 7. Sheet 3 is supported on a flat horizontal surface (not shown), while sheet 4 is loaded with a flat weight (not shown) made for instance of polished stainless steel or other suitable good conductor of heat. Next, the assembly is heated in a furnace (not shown) to cause the dots 6 and the ribbon 7 to flow and wet the surface 2 of sheet 4. The ribbon 7 forms the perimeter seal, while the dots 6 spread slightly to allow the sheet 4 to sink under the pressure provided by the weight towards the sheet 3 till arrested by the dots 5 which have remained unsoftened. The heating of the assembly is just sufficient to soften the thin sheet 4 to the extent that it distorts slightly under the loading of the weight so that the surface 1 is brought into conformity with the surface contour of surface 1 of sheet 3. This occurs at a temperature in the region of 580° C. Finally, after the assembly has been cooled, it is filled with a liquid crystal material either through a gap left in the perimeter seal or through an aperture on sheet 3. The filling orifice is then plugged for instance with a pellet of indium which is then sealed in position with epoxy resin.

As an alternative to using a glass which readily devitrifies, the frit from which the spacer dots 5 are made may be made of a glass mixture of the type defined in claim 1 of British patent specification No. 1,376,393 previously referred to. An advantage of using this type of glass mixture is that an intimate mixture of fine powders of heat treatment required to raise the temperature of its fixed points can be much faster than that for achieving a corresponding effect with a devitrifying glass. This is because devitrification is inevitably a relatively slow process in order for it to be possible for the particular glass composition concerned to be capable of being prepared in a vitreous form in the first instance.

In the above described method, it will be appreciated that the uniformity of spacing between the two sheets of the completed cell is primarily limited by the flatness of the float glass sheet 3 and that of the weight loading sheet 2. In certain circumstances some improvement in uniformity of spacing may be achievable by removing this limitation by using a non-rigid weight to load sheet 2. For instance, the sheet can be loaded with fine sand placed in a flexible foil container.

It may be preferable to choose for the spacer dots a glass that has a lower integrated thermal expansion coefficient than that of the tie dots and the perimeter seal so that, upon cooling down to room temperature after firing, the tie dots pull the thinner sheet firmly against the spacer dots.

We claim:

1. A method of making an envelope in which two glass sheets are secured with a glass perimeter seal to form the envelope, comprising the steps of:

depositing a glass on one of the sheets to form an array of spacer dots, said glass having characteristics such that when it is heated to a predetermined temperature below the softening temperature of the sheets, it attains a softening temperature above that of the sheets;

heating said glass spacer dots to said predetermined temperature to effect a change in the softening temperature of the glass spacer dots;

depositing a glass on one of the sheets to form an array of tie dots having a greater thickness than that of the spacer dots, said glass having characteristics such that it flows at the softening point of the sheets;

depositing a glass on one of the sheets to form a glass perimeter ribbon of greater thickness than that of the spacer dots, said glass having characteristics such that it flows at the softening point of the sheets;

assembling the sheets with the arrays of dots and the perimeter ribbon facing inwardly;

heating the assembly to a temperature at which the tie dots and the perimeter ribbon soften to wet the sheets and at least one of the sheets softens sufficiently for its inner surface to distort to conform to the contour of the inner surface of the other sheet from which it is held uniformly spaced by the unsoftened spacer dots; and cooling said assembly, whereby the perimeter ribbon seals the assembly and the tie dots connect the sheets.

2. The method of claim 1, wherein the spacer dots, the tie dots and the perimeter seal are all applied to one sheet.

3. The method of claim 1, wherein one of the sheets is relatively thin compared with the other, said sheet distorting upon heating to conform to the other sheet.

4. The method of claim 3, wherein the thinner sheet is not more than 1mm thick and the thicker sheet is 3mm thick or greater.

5. The method of claim 3, wherein the spacer dots, the tie dots and the perimeter seal are all applied to the thicker sheet.

6. The method of claim 3, wherein the thicker sheet is made of float glass.

7. The method of claim 1, wherein tie dots and the perimeter seal are made of the same glass.

8. The method of claim 1, wherein the perimeter seal is made of a glass having an expansion coefficient matched with that of the two sheets.

9. The method of claim 1, wherein the integrated thermal expansion coefficient between room temperature and the firing temperature of the spacer dots is smaller than that of the tie dots.

10. The method of claim 1, wherein said distortion is brought about by the action of heat from above the glass sheets.

11. The method of claim 1, wherein both heat and pressure are applied to the envelope to effect said distortion.

12. The method of claim 1, wherein the spacer dots are applied by screen printing.

13. The method of claim 1, wherein the spacer dots are applied with at least one hollow stylus.

14. The method of claim 1, wherein the tie dots are applied by screen printing.

15. The method of claim 1, wherein the tie dots are applied with at least one hollow stylus.

16. The method of claim 1, wherein the envelope is adapted for use as a large area liquid crystal cell, wherein the glass sheets have an area of at least 100 square centimeters, and the spacing between the sheets is uniformly held to a range of 9 to 15 microns.

17. The method of claim 1, wherein the spacer dots are formed of a glass that readily devitrifies at said predetermined temperature to form a crystalline structure having a higher softening point.

18. The method of claim 1, wherein the spacer dots are formed of a glass mixture including at least one constituent part that flows at the predetermined temperature and dissolves another constituent part to form a composition having a flow temperature above that of the sheets.

* * * * *